United States Patent [19]

Omata

[11] 4,438,552
[45] Mar. 27, 1984

[54] PLASTIC FASTENER
[75] Inventor: Nobuaki Omata, Hiroshima, Japan
[73] Assignee: Nifco Inc., Yokohama, Japan
[21] Appl. No.: 329,487
[22] Filed: Dec. 10, 1981
[30] Foreign Application Priority Data Dec. 12, 1980 [JP] Japan ................. 55-174736

[51] Int. Cl.³ .............................................. A44B 17/00
[52] U.S. Cl. .................................... 24/297; 24/292;
[58] Field of Search ............... 24/289, 291, 292, 293,
24/295, 297, 208 A, 213 B, 213 R, 214, 221 R

[56] References Cited
U.S. PATENT DOCUMENTS

| 2,765,698 | 10/1956 | Devine | 24/221 R |
|---|---|---|---|
| 3,029,486 | 4/1962 | Raymond | 24/213 R |
| 3,040,401 | 6/1962 | Von Rath | 24/297 |
| 3,249,973 | 5/1966 | Seckerson | 24/214 |
| 3,864,789 | 2/1975 | Leitner | 24/293 |
| 4,114,339 | 9/1978 | Ito | 24/214 |
| 4,261,151 | 4/1981 | Ito | 24/214 |
| 4,285,103 | 8/1981 | Inamoto | 24/293 |
| 4,312,614 | 1/1982 | Palmer et al. | 24/208 A |

FOREIGN PATENT DOCUMENTS 1065914 4/1967 United Kingdom ................. 24/297

Primary Examiner—Gene Mancene
Assistant Examiner—James Hokomaki
Attorney, Agent, or Firm—Trexler, Bushnell & Wolters, Ltd.

[57] ABSTRACT

A plastic fastener comprises an insertion leg of the general shape of the letter V, a pair of flange pieces disposed at the free ends of the insertion leg, and a pair of head pieces extended upwardly from the respective flange pieces. This fastener assumes its complete state by causing the head pieces to be twisted sidewise and moved past each other and subsequently allowing the rear edges of the head pieces to abut against each other. Two plates can be attached fast to each other simply by inserting the combined head portion of the fastener into the perforation formed in advance in one of the two plates and forcing the insertion leg into the perforation formed in advance in the other plate. Desired separation of the insertion leg from the latter plate is accomplished by moving the rear edges of the head pieces apart from each other.

4 Claims, 9 Drawing Figures

PLASTIC FASTENER

BACKGROUND OF THE INVENTION

This invention relates to a plastic fastener for fastening a part such as an ornamental article to a plate member such as an automobile body or for fastening two plate members to each other.

Among the class of fasteners heretofore proposed for fastening two plate members to each other, there is counted a fastener which comprises a flange and two insertion legs extended in the opposite directions from the flange and each provided with engaging means. This particular fastener is adapted to join two plate members to each other by causing the two insertion legs to be inserted into matched perforations bored in advance in the two plate members. One fault found with this fastener is that this fastener is not provided with means for breaking the engagement between the insertion legs and the plate members and, therefore, the two plate members once joined therewith are disengaged from each other with great difficulty. Particularly where the insertion leg protrudes from the rear side of the plate member which is not accessible by any means, the fastener can never be released from the plate member.

SUMMARY OF THE INVENTION

An object of this invention is to provide an improved plastic fastener, so constructed that it comes into powerful engagement with a plate member subjected to fastening, enables the insertion thereof into the perforation to be performed with an easy work, and permits desired separation of the insertion leg from the perforation for the release of the fastener from the plate member to be effected with a simple work.

To accomplish the object described above according to the present invention, there is provided a plastic fastener which integrally comprises an insertion leg for insertion into and consequent engagement with a perforation formed in a plate member, a flange for restricting the amount of the insertion of the insertion leg, and a non-circular head portion provided on the upper surface of the flange and adapted to secure in position a part to be fastened to the plate member.

The insertion leg is formed of a pair of leg pieces each provided at the outer extremity thereof with an engaging portion and collectively having the general shape of the letter V. The flange is composed of a pair of plate-like flange pieces formed at the free ends of the leg pieces. The head portion is composed of one pair of head pieces formed on the respective flange pieces through the medium of shanks. The head portion is formed by causing the two shanks to cross each other so that the head pieces formed at the free ends of the leg pieces opposed to each other assume their positions above the leg pieces. Owing to the resilient force of the leg pieces, the head pieces disposed as described above exert pressure to bear upon each other. The head portion held in a non-circular shape is inserted into a matched perforation formed in advance in one plate member and brought into fast engagement with that plate member. Then, the V-shaped leg portion is inserted into a matched perforation formed in advance in the other plate member until the engaging portion of the leg pieces thereof are brought into fast engagement with the edges of the perforation. Thus easily can the two plate members be fastened to each other by virtue of the fastener of this invention.

The separation of the inserted leg from the plate member is accomplished by a simple work of inserting a tool such as a screw driver between the two head pieces together forming the head portion thereby widening the distance between the head pieces, allowing the engaging portions of the leg pieces to slip out of the perforation, and thereafter giving a pull at the fastener.

The other objects and characteristics of the present invention will become apparent from the further disclosure of the invention to be made hereinafter with reference to the accompanying drawings.

DESCRIPTION OF THE PREFERRED EMBODIMENTS

Figure 1:
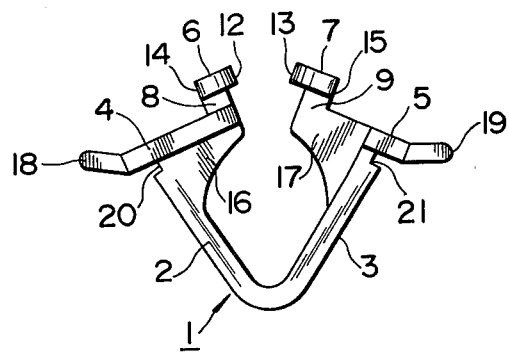
FIG. 1 is a front view of a fastener of this invention in its original form in which the fastener is molded of a synthetic resin.

This invention relates to a plastic fastener which provides fast union between plate members or between a plate member and a desired object by a simple work and which permits easy disengagement of the fast union of such parts.

The illustrated embodiment represents a typical example of the fastener of this invention as used for fastening one movable plate 31 to another stationary plate 30 as in securing an ornamental article to an automobile body, for example.

First, the fastener of the present invention will be described with reference to the original form thereof illustrated in FIGS. 1 and 2. Here, 1 denotes an insertion leg formed in a cross section of the general shape of the letter V, and 2, 3 denote opposed leg pieces of the insertion leg, 4, 5 flange pieces disposed at the free ends of the leg pieces substantially at right angles relative to the directions of the lengths of the leg pieces, and 6, 7 head pieces disposed parallel to the upper surfaces of the flange pieces at the upper ends of shanks 8, 9 raised vertically from the opposed edges of the flange pieces 4, 5.

As illustrated, the insertion leg 1 is made of a strip of material of a required thickness which is bent in the middle portion of the length thereof in the shape of the letter V so as to give rise to the two leg pieces 2, 3. Owing to this construction, the free ends (upper ends) of the two leg pieces 2, 3 can freely be bent in the tangential directions, with the leading end, namely, the bent middle portion, of the leg as the center. The flange pieces 4, 5 which are disposed at the free ends of the two leg pieces 2, 3 are formed of a plate in the shape of the letter L. The sides 4a, 5a of the L-shapes have the ends in the directions of lengths fall flush with the ends of the respective leg pieces 2, 3 in the directions of widths, whereas the remaining sides 4b, 5b of the L-shapes are extended toward each other in such a manner that the extended sides stagger from each other. In the illustrated embodiment, the sides 4a, 5a of the two L-shaped flange pieces 4, 5 are connected to the free ends of the respective leg pieces and thereby are made to run parallel to each other and, at the same time, the remaining sides 4b, 5b are extended from the opposite positions so as to stagger from each other. Consequently, the two flange pieces are symmetrical to each other relative to the central point of the two flange pieces.

The shanks 8, 9 which rise from the flange pieces 4, 5 are extended from the opposed edges 10, 11 of the sides 4a, 5a of the L shapes extended in a staggered pattern, so as to thrust out from the upper surfaces of the flange pieces. The head pieces 6, 7 are disposed in a manner mounted on the ends of the shanks. These two head pieces 6, 7 are formed each substantially in a semi-elliptic shape, with the opposed edges 12, 13 each formed in an arcuate curve and the respective rear edges 14, 15 each formed in a straight line. Further, the two head pieces are disposed above the opposed edges of the two flange pieces through the medium of shanks and they are positioned at the centers of the respective flange pieces so as to be opposed to each other.

In the drawing, by 16, 17 are denoted ribs for reinforcing both the leg pieces and the flange pieces; 18, 19 spring pieces extended diagonally from the rear edges of the respective flange pieces 4, 5; and 20, 21 engaging portions formed in the shape of notches on the outer sides of the free ends of the leg pieces 2, 3 of the insertion leg 1.

Figure 2:
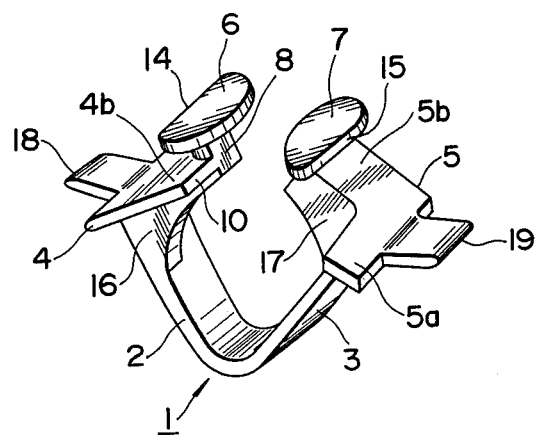
FIG. 2 is a perspective view of the fastener of FIG. 1.

The fastener of the present invention which has its component parts formed as described above is integrally molded of a synthetic resin in the shape illustrated in FIGS. 1 and 2. It is so formed that the insertion leg 1 has its leg pieces 2, 3 kept in a rather opened than closed state and, consequently, the flange pieces 4, 5 formed at the free ends of the leg pieces are kept apart from each other at a distance.

Figure 3:
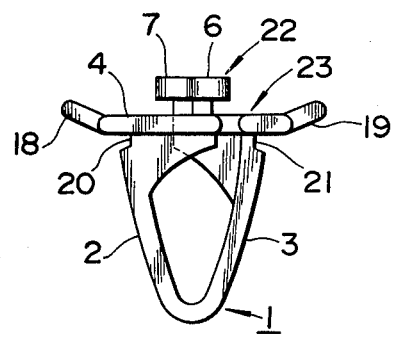
FIG. 3 is a front view of the fastener in its complete form ready for use.
Figure 4:
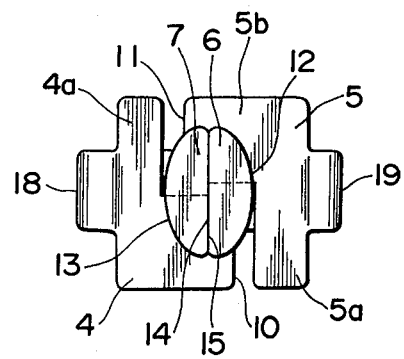
FIG. 4 is a plan view of the fastener of FIG. 3.
Figure 5:
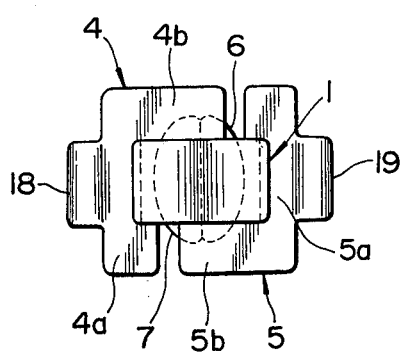
FIG. 5 is a bottom view of the fastener of FIG. 3
Figure 6:
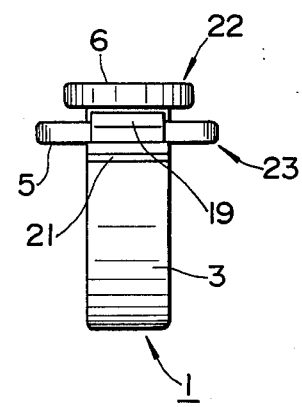
FIG. 6 is a righthand side view of the fastener of FIG. 3

The fastener formed in the state described above can be made to assume its complete state by combining the flange pieces 4, 5 thereof together and the head pieces 6, 7 thereof together as illustrated in FIG. 3 and the subsequent figures to form one flange and one head portion respectively.

To be more specific, after the fastener has been formed with the leg pieces 2, 3 thereof held in an open state as described above, the free ends of the leg pieces 2, 3 are brought toward each other against the repulsive force of the insertion leg 1 and, at the same time, the flange pieces 4, 5 disposed at these free ends are brought closer together while being moved laterally so that the head pieces 6, 7 disposed as opposed to each other will be advanced past each other, one head piece 7 (or 6) will occupy its position behind the other head piece 6 (or 7), and the rear edges 14, 15 of the two head pieces 6, 7 will abut against each other. Consequently, the two head pieces 6, 7 each formed in a substantially semi-elliptic shape jointly form a head portion 22 in an elliptic shape. At the same time, the two flange pieces 4, 5 are joined in one common plane to form one flange 23. Similarly, the two shank pieces 8, 9 are combined face to face into one shank. In consequence of the aforementioned combination, there is obtained a fastener in its complete state wherein the insertion leg 1 of the shape of the letter V hangs down from the lower surface of the flange 23, one shank extends from the center of the flange, and one head portion is disposed at the upper end of the extended shank as illustrated in FIG. 3.

During the combination of the component parts as described above, the open insertion leg is squeezed with the leg pieces thereof brought closer to each other as though in a twisted manner to advance the head portions 6, 7 past each other. When the twisting force is loosened, the leg pieces resume their original shape and, consequently, the head pieces move sidewise toward each other and automatically come into intimate contact back to back with each other and, in the present embodiment, give birth to one head portion of an elliptical shape. The engagement of the head pieces described above freezes the distance separating the free ends of the leg pieces of the insertion leg 1 and, thereafter, keeps the leg portion in restraint. In its restrained condition, the insertion leg 1 keeps in storage the force tending to force the leg open and automatically assumes a resilient force. Owing to this resilient force stored in the insertion leg 1, the head pieces are allowed to remain in powerful engagement and keep the joined head portion 22 intact.

Figure 7:
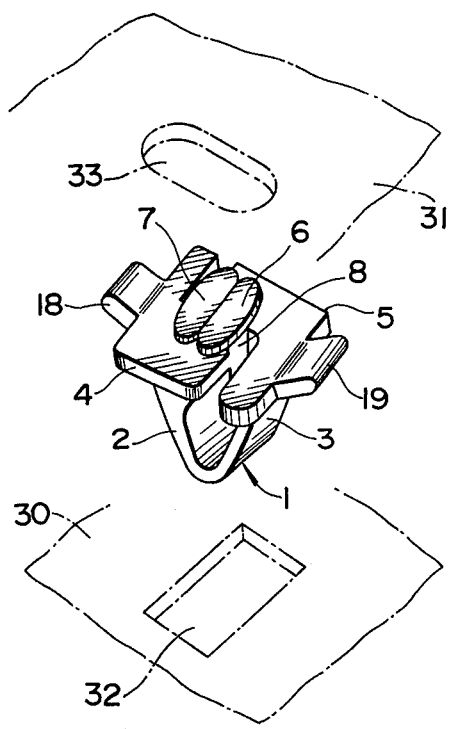
FIG. 7 is a perspective view of the fastener of FIG. 3.
Figure 8:
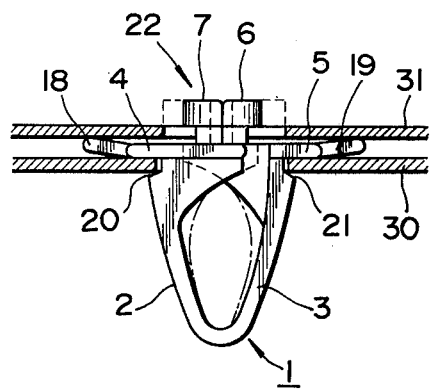
FIG. 8 is a partially sectioned front view of the fastener in a form in use.

In the present embodiment, a rectangular perforation 32 is formed as indicated by an alternating dot and dash line in FIG. 7 in one plate 30 and an elliptic perforation 33 larger than the outline figure of the head portion 22 is formed in the other plate 31. The union of these two plates is accomplished by first aligning the direction of the length of the head portion 22 with that of the perforation 33 in the plate 31, piercing the head portion 22 upwardly through this perforation from one side (the underside) of the plate until it rises past the opposite side of the plate, and rotating the fastener by 90° thereby causing the longer edges (lateral edges of the flange pieces 6, 7) of the head portion to ride on the plate and securing the fastener to the plate 31. As is evident from this work, the shanks 8, 9 which support the head portion in position have their lengths fixed by the thickness of the plate 31. Further, the spring pieces 18, 19 are so designed that when the head portion 22 comes into intimate engagement with the plate 31 as described above, they will press the lower surface of the plate and consequently, keep the lower surface of the head portion strongly pressed against the upper surface of the plate.

After the fastener has been secured to one plate 31, the insertion leg 1 which hangs down from the flange 23 is posed directly above the perforation 32 in the other plate 30 and then forced into the perforation against the resilience of the two leg pieces until the engaging parts 20, 21 formed on the outer surfaces of the leg pieces are brought into biting engagement with the edges of the perforation 32. Consequently, the two plates are attached fast to each other through the medium of the fastener.

As described above, the fastener of the present invention enables two given plates to be attached fast to each other by causing the head portion 22 thereof to be inserted from one side of the plate 31 into the perforation 33 therein and then rotated on the other side of the plate and forcing the insertion leg 1 through the perforation 32 in the other plate. Thus, the fastener of this invention is easy to handle. Since the insertion leg 1 assumes the resilience owing to the aforementioned combination of the component parts, the force with which it comes into engagement with the perforation is so great that this engagement will not be broken by a mere pull. Further, since the engagement of the head portion 22 with the other plate is accomplished by causing the head portion to be inserted through the perforation and then rotated on the other side of the plate and brought into tight contact with the opposite surface of the plate, it cannot be easily drawn out of the plate as it is.

Figure 9:
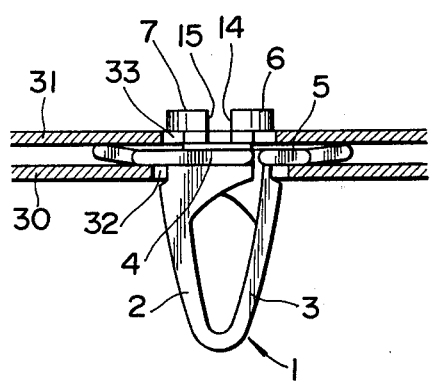
FIG. 9 is a partially sectioned front view of the fastener in a state released from engagement with the plate members.

Since, in the fastener of this invention, the head portion 22 which is intended for engagement with the plate 31 is formed by combining the two head portions 6, 7, a metallic piece such as a screw driver can be driven between the rear edges 14, 15 of the two head pieces 6, 7 which are abutted against each other as illustrated in FIG. 9. As the rear edges are pushed apart from each other by the screw driver against the resilience of the insertion leg 1, the leg pieces 2, 3 of the insertion leg 1 which is kept in fast engagement with the perforation 32 of the other plate 30 are consequently brought toward each other to the extent of breaking the engagement of the engaging parts 20, 21 with the edges of the perforation 32. Thus, the insertion leg 1 can be easily removed from the perforation 32.

The present invention, therefore, provides powerful union of the two plates and, on the other hand, permits the union to be broken by a simple work as described above, the fastener of this invention, accordingly, can be used advantageously for joining parts which at times are required to be separated. This fastener is economical because it can be reused after the separation of the parts from their union. When this fastener is molded of a synthetic resin, it can be formed in the shape illustrated in FIG. 1 and FIG. 2. Despite the relatively complicated shape which the fastener assumes in its complete state, therefore, the fastener can be molded in a very simple molding die. Thus, the fastener has the advantage that it can be offered at a low cost.

In the embodiment of the present invention so far described, the flange pieces 4, 5 are formed each in the shape of the letter L. This particular shape has been selected so that when they are combined to form a flange 23, the produced flange will substantially assume the shape of a square. Thus, the shape of each of the flange pieces may be suitably selected so that when the two flange pieces are combined, the produced flange will assume a desired shape. Entirely the same thing applies to the shape of each of the head pieces 6, 7 which are combined to form the head portion 22. Specifically in the case of the head pieces 6, 7, notches formed in the central parts of the rear edges 14, 15 will prove convenient because they facilitate the insertion of the screw driver between the rear edges for the separation of the insertion leg from the plate 30.

What is claimed is:

1. A one piece plastic fastener comprising: a resilient insertion leg formed of a pair of leg pieces joined integrally to each other in the general shape of the letter V and each provided on the outer side thereof with an engaging part, a flange formed of a pair of plate-shaped pieces disposed at the free ends of said leg pieces, and a head portion consisting of a pair of head pieces disposed at the leading ends of shanks extended upwardly from said plate-shaped pieces, said head portions initially being spaced apart in predetermined orientation, said head pieces being interengageable by a twisting movement of said head pieces past each other to lock behind one another in reverse orientation, said head pieces being urged toward each other by said resilient leg, whereby separation of said head pieces causes movement of said leg pieces toward each other.

2. The fastener according to claim 1, wherein said head portion is formed in an elliptic shape.

3. The fastener according to claim 1, wherein reinforcing ribs are provided between said leg pieces and said plate-shaped pieces.

4. The fastener according to claim 1, wherein the plate-shaped pieces are provided one each with spring pieces extended diagonally from the free ends thereof.

* * * * *